United States Patent
Thompson

(10) Patent No.: US 10,630,553 B2
(45) Date of Patent: Apr. 21, 2020

(54) BANDWIDTH THROTTLING

(71) Applicant: Walmart Apollo, LLC, Bentonville, AR (US)

(72) Inventor: Jeremy Scott Thompson, Bentonville, AR (US)

(73) Assignee: Walmart Apollo, LLC, Bentonville, AR (US)

(*) Notice: Subject to any disclaimer, the term of this patent is extended or adjusted under 35 U.S.C. 154(b) by 100 days.

(21) Appl. No.: 15/747,757

(22) PCT Filed: Aug. 17, 2016

(86) PCT No.: PCT/US2016/047336
§ 371 (c)(1),
(2) Date: Jan. 25, 2018

(87) PCT Pub. No.: WO2017/031203
PCT Pub. Date: Feb. 23, 2017

(65) Prior Publication Data
US 2018/0219741 A1 Aug. 2, 2018

Related U.S. Application Data

(60) Provisional application No. 62/206,715, filed on Aug. 18, 2015.

(51) Int. Cl.
*H04L 12/801* (2013.01)
*H04L 12/24* (2006.01)
(Continued)

(52) U.S. Cl.
CPC ...... *H04L 41/0896* (2013.01); *H04L 43/0852* (2013.01); *H04L 43/0882* (2013.01);
(Continued)

(58) Field of Classification Search
CPC ....... H04L 47/10; H04L 47/28; H04L 47/283; H04L 41/0896
See application file for complete search history.

(56) References Cited

U.S. PATENT DOCUMENTS 7,346,000 B1 * 3/2008 Srinivasan .......... H04L 41/0896
370/235
7,668,089 B1 * 2/2010 Srinivasan .......... H04L 41/0896
370/230
(Continued)

OTHER PUBLICATIONS

Young, Lee W., international Search Report, International Application No. PCT/US2016/047336, dated Oct. 24, 2016, 2 pages.
(Continued)

*Primary Examiner* — Jeong S Park

(57) ABSTRACT

A throttling system measures current latency and bandwidth of a network connection. Latency and bandwidth may be measured by sending an unthrottled packet train and measuring a rate of receipt of the packet train as well as overall latency for the packet train. A percentage of available bandwidth is calculated according to a function of a previous percentage of available bandwidth and current latency and bandwidth measurements. The percentage of available bandwidth may decrease with increasing latency. The percentage of available bandwidth is calculated every N packets in order to adapt to changing conditions in a network. The rate of packet transmission may be throttled by increasing a period between transmissions of packets in order to use the percentage of available bandwidth.

20 Claims, 4 Drawing Sheets

(51) Int. Cl.
*H04L 12/26* (2006.01)
*H04L 12/825* (2013.01)
*H04L 29/06* (2006.01)
*H04L 12/841* (2013.01)

(52) U.S. Cl.
CPC .............. *H04L 43/12* (2013.01); *H04L 47/10* (2013.01); *H04L 47/25* (2013.01); *H04L 67/42* (2013.01); *H04L 69/16* (2013.01); *H04L 47/28* (2013.01); *H04L 47/283* (2013.01)

(56) References Cited

U.S. PATENT DOCUMENTS

| | | |
|---|---|---|
| 8,577,994 B2 | 11/2013 | Shuster |
| 2003/0135639 A1* | 7/2003 | Marejka ................. H04L 47/10 709/232 |
| 2005/0083957 A1 | 4/2005 | Ilnicki et al. |
| 2007/0230413 A1* | 10/2007 | Gandhi ............... H04L 43/0852 370/338 |
| 2008/0037510 A1* | 2/2008 | Yamada ................. H04L 47/10 370/349 |
| 2010/0110892 A1* | 5/2010 | Lai ......................... H04L 47/10 370/235 |
| 2011/0066752 A1 | 3/2011 | Lippincott et al. |
| 2012/0163191 A1* | 6/2012 | Tokimizu ............ H04L 41/0677 370/242 |
| 2013/0100816 A1* | 4/2013 | Bergamasco ....... H04L 43/0864 370/237 |
| 2013/0160023 A1* | 6/2013 | Suzuki ................. G06F 9/4887 718/104 |
| 2017/0005937 A1* | 1/2017 | Morita ............... H04L 43/0864 |

OTHER PUBLICATIONS

Young, Lee W., Written Opinion International Application No. PCT/US2016/047336, dated Oct. 24, 2016, 5 pages.

* cited by examiner

BANDWIDTH THROTTLING

BACKGROUND

Field of the Invention

This invention relates to systems and methods for managing usage of bandwidth in a network environment

Background of the Invention

File transfers between a central server of a large corporation and various business units is often throttled using a static bandwidth throttling system to avoid impacting network performance. This static system may be manually set per machine or site and must be set low enough that multiple transfers do not impact the network for any given site. Due to the low setting in the static throttling, transfers cannot utilize available bandwidth that is not being used. In addition, even with this low static setting, network impact may still occur occasionally, which results in additional adjustments to the static throttling file to slow the transfers down even more.

The systems disclosed herein provide an improved approach to throttling bandwidth in large networks.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
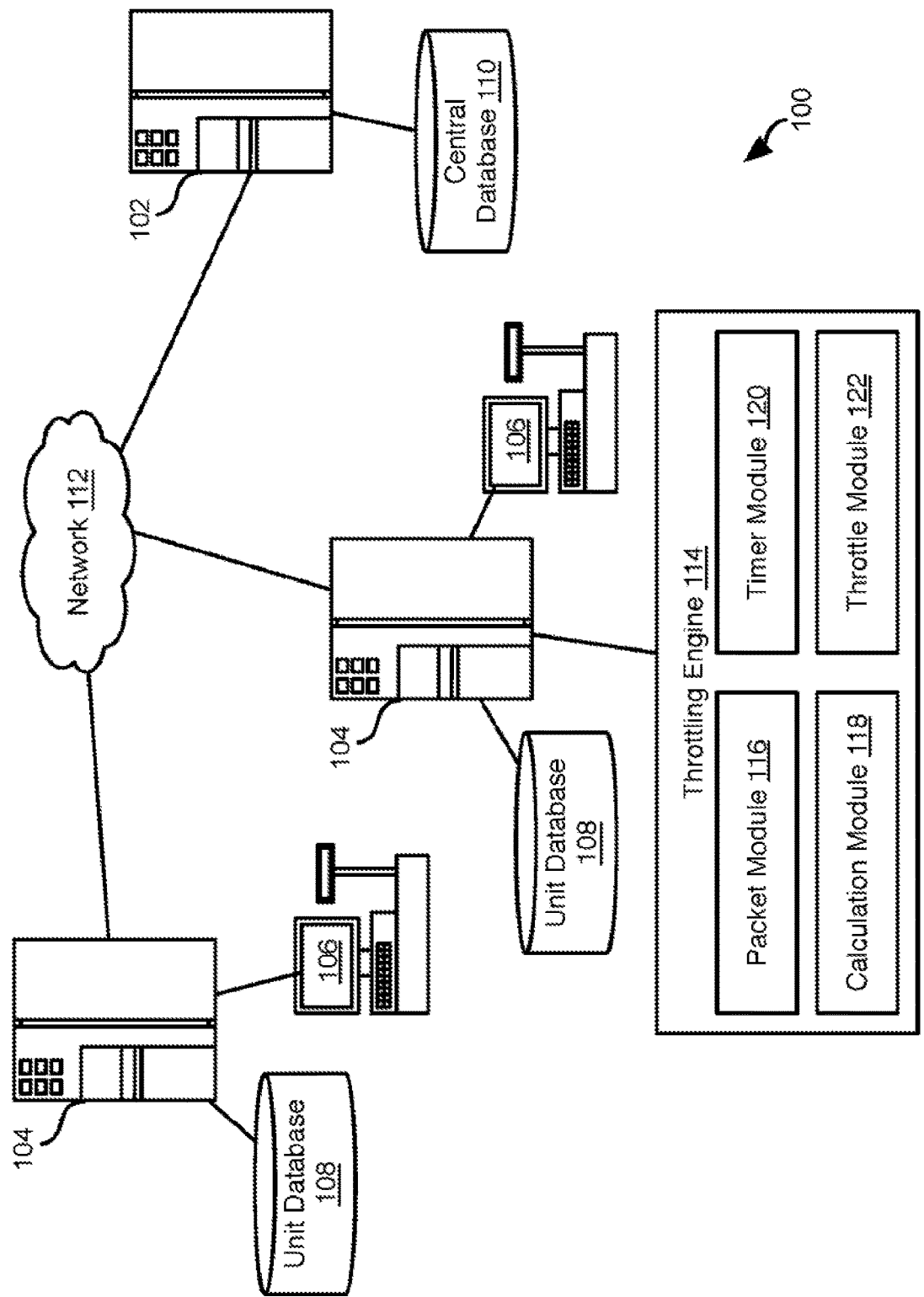
FIG. 1 is a schematic block diagram of a network environment suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, a network environment 100 may be used to implement methods as described herein. The environment 100 may include a server system 102 associated with a corporate parent or controlling entity having one or more retail establishments associated therewith. A retail establishment, or group of retail establishments in a geographic region (e.g. a country, state, or other region) may be associated with one or more unit servers 104. For example, points of sale (POS) 106 at the various retail establishments in a geographic region may report sales data to the unit servers 104. Retail establishments may report data such as sales and inventory data to the unit servers 104. Other business intelligence information may be shared by retail establishments with the unit servers 104. The unit servers 104 may host or access unit databases 108 for storing data received from the various retail establishments.

The unit servers 104 may periodically report data from the unit databases 108 to the central server 102. The central server 102 may store this data in a central database 110 or otherwise processes or aggregate the data for use in characterizing performance of the business units and retail establishments associated with the unit servers 104.

The server system 102 may be in data communication with unit servers 104 by means of a network 112. The network 112 may include any wired or wireless connections and may include some or all of a local area network (LAN), wide area network (WAN), the Internet, or other type of network.

Some or all of the unit servers 104 may implement a throttling engine 114 to determine how much bandwidth to use when transmitting files to the central server 102. In particular, for at least part of the network path between the unit servers 104 and the central server 102, many of the unit servers may communicate over the same network hardware. Likewise, networking hardware of the central server 102 must handle all network communicate from the unit servers 104. Accordingly, throttling of bandwidth usage by the unit servers 104 may be performed in order to avoid degrading network performance.

The throttling engine 114 may include a packet module 116 operable to generate and send sets of measurement packets for transmission from the unit server 104 operating as a client to a central server 102 over a connection between the client and the server, such as through the network 112.

The throttling engine 114 may include a calculation module 118 operable to calculate (a) an available bandwidth and a new latency ratio from transmission times for the sets of measurement packets provided to the unit server 104 by the central server 102. The calculation module 118 may further calculate a hold time from the available bandwidth and the new latency ratio, the hold time being a delay between packets transmitted by the unit server 104. For example, the hold time may be time set by the usleep( ) function implemented according to the TCP protocol.

The throttling engine 114 may include a timer module 120 operable to implement a cycling timer set to the hold time. The throttling engine 114 may further implement a throttle module 122 operable to prevent transmission of packets from the client to the server until expiration of a cycle of the cycling timer for each packet transmitted.

Figure 2:
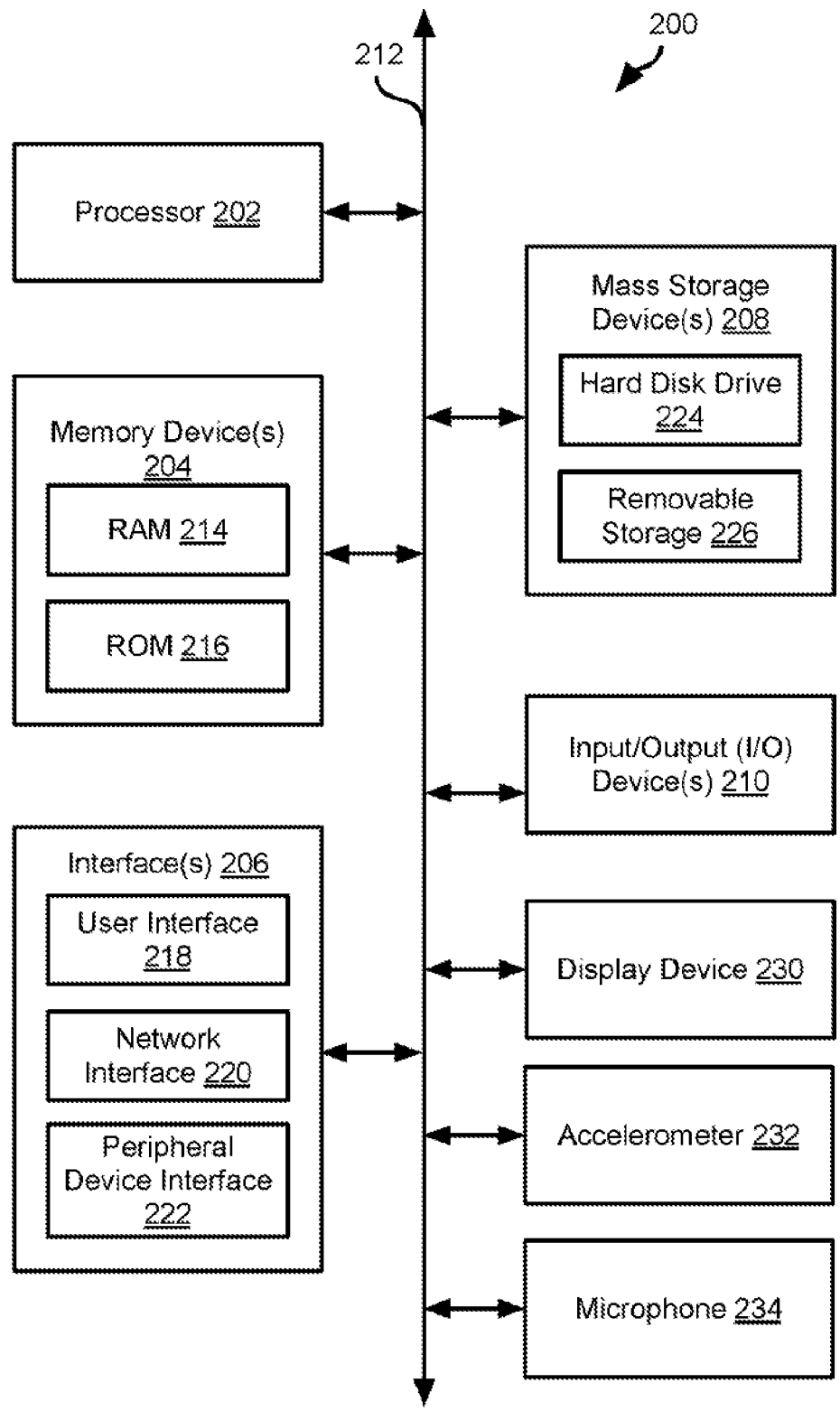
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The central server 102, unit servers 104, POSs 106 may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, a tablet computer and the like. A server system 102 may include one or more computing devices 200 each including one or more processors.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

A computing device 200 implementing the user computers 108 may advantageously include one or more sensors. The output of these sensors may be used to determine whether a media file is viewed solely for inspiration or viewed during execution of a meal that the media file instructs how to prepare. In some embodiments, the sensors include an accelerometer 232 that detects acceleration of the user computer 108 in which it is included as well as the orientation thereof. In some embodiments, the sensors further include a microphone 234 capable of detecting sounds incident on the user computer 108.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
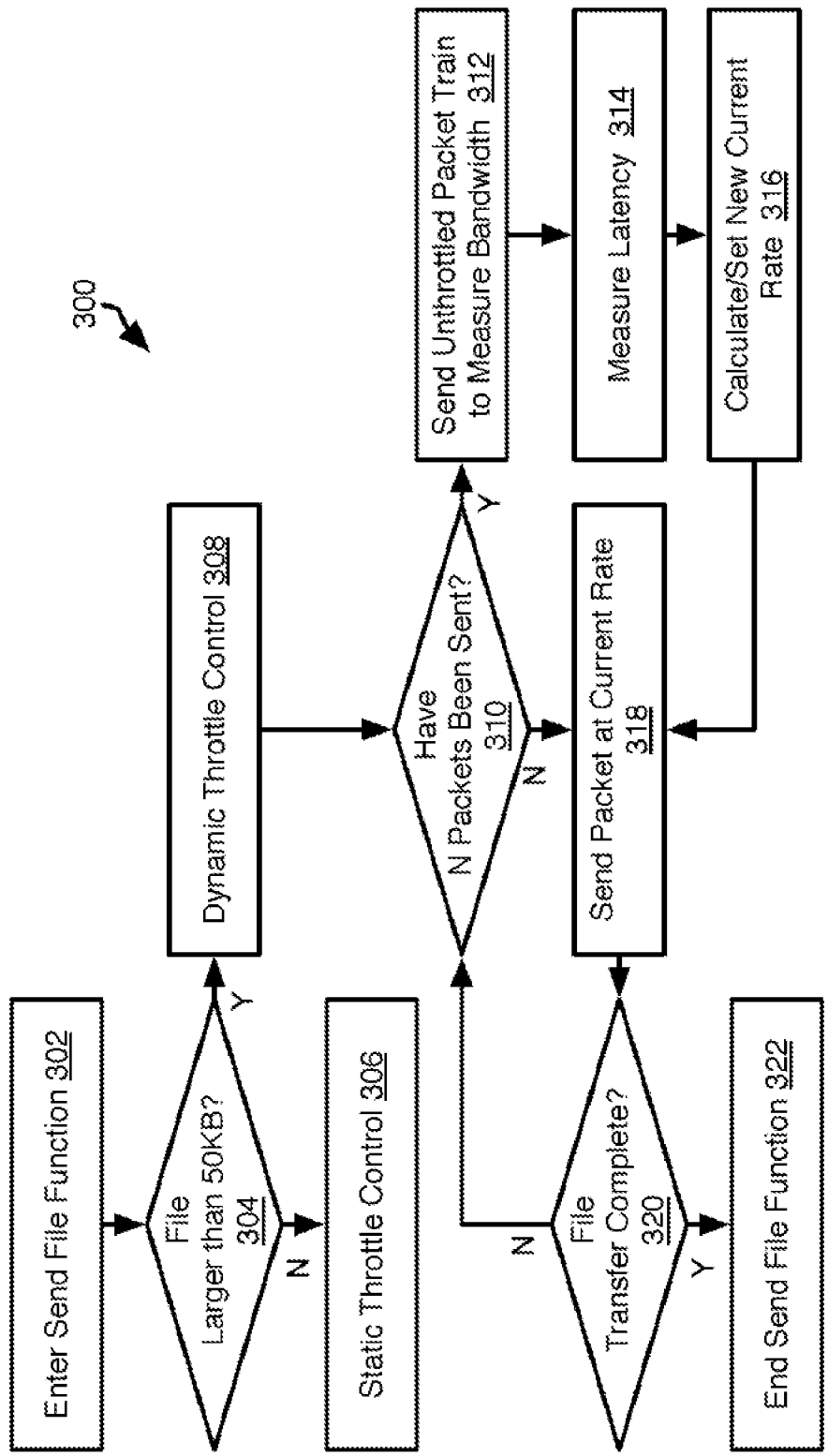
FIG. 3 is a process flow diagram of a method for performing a file transfer using dynamic throttling in accordance with an embodiment of the present invention.

Referring to FIG. 3, the illustrated method 300 may be used to determine an appropriate throttling rate for a unit server 104. In particular, the method 300 implements a dynamic system that runs periodic tests on the network 112 to see what bandwidth is currently available. The dynamic throttling system adjusts the bandwidth it utilizes according to what is available. If there are multiple transfers on the network, the dynamic system will automatically scale back the bandwidth it is utilizing. If there is bandwidth that suddenly becomes available, the dynamic system will automatically adjust to utilize that additional bandwidth.

In experiments conducted by the inventor, zero impacted sites occurred when the dynamic throttle control system was implemented and file transfer speeds were increased by 250% in many international data flows.

The illustrated method 300 may include entering a send file function 302. For example, the send file function 302 may be invoked to transfer a file to the central server 102. The remaining steps of the method 300 may be performed as part of executing the send file function with respect to the file.

The method 300 may include evaluating 304 whether the file is larger than a minimum file size, 50 KB in the illustrated embodiment. Other minimum file sizes may also be used depending on typical file size and network capacity. If the file is less than the minimum file size, then throttling of transmission of the file may be performed 306 statically, i.e. the transmission of packets may be transmitted at a statically set rate that is not dependent on latency. For example, data may be transmitted to use no more than a fixed percentage of available bandwidth, e.g., 80 percent.

If the minimum file size is determined 304 to be larger than the minimum file size, then dynamic throttle control 308 may be performed, such as according to some or all of steps 310-322.

The method 300 may include evaluating whether N packets have been sent 310. In particular, the throttling rate may be evaluated in the method 300 every N packets. Accordingly, the first N packets of a file may be transmitted according to a default rate. The default rate may then be altered for subsequent packets in response to changes in latency. In some embodiments, the value of N is 40, however other values may be used depending on how rapidly latency is expected to change.

If N packets are found 310 to have been sent, then the method 300 may include sending 312 an unthrottled packet train to measure available bandwidth and sending and receiving 314 packets to measure latency. For example, step 312 may include sending a packet train to the central server 102, the central server 102 records the time it takes to receive the entire packet train. That time value is then sent back to the unit server 104 performing the method 300. The unit server 104 then uses this time value to determine available bandwidth (BW) using (1)

$$BW = \frac{\text{Packet Size} * \text{Packet Count}}{\Delta t}, \quad (1)$$

where $\Delta t$ is the time required for the entire packet train to reach the server received from the central server, Packet Size is the size of the packets sent (e.g., in bytes), and Packet Count is the number of packets in the packet train. The number of packets in the packet train may be large enough to compensate for variability in the transmission rate of individual packets. For example, between four and sixteen packets may be included in the packet train.

The method 300 may further include measuring 314 latency. In particular, for the transmission of the packet train sent at step 312, an overall time that it took to send the packets of the packet train to the server may be evaluated. This overall time may be a time elapsed between transmission of a first packet of the packet train and receipt of a last packet of the packet train by the central server. The time of receipt of the last packet of the packet train may be transmitted by the central server 102 to the unit server 104.

The method 300 may then include calculating and setting a new transmission rate based on the bandwidth and latency determined at steps 312 and 314. The new transmission rate (rate) may be set according to (2).

$$\text{rate} = \frac{1}{\left(\frac{\left(\frac{\text{Packet Size} \cdot \text{Packet Count}}{\Delta t \text{ of packet train}}\right)}{\left(\text{Original \% Used}\left(\frac{\text{Original latency}}{\left(\frac{\text{Current Latency}}{\text{Number of Packets}}\right)}\right)\right)}\right)} \quad (2)$$

Equation (2) calculates a rate at which the application will send packets to a destination, i.e. the central server 102. In particular, rate may be provided to the usleep( ) subroutine to create the pause necessary between packets sends to achieve the desired bandwidth utilization. The rate calculated above is multiplied by 1e6 to obtain the necessary microseconds for the usleep( ) subroutine.

The equation term $$\left(\frac{\text{Packet Size} \cdot \text{Packet Count}}{\Delta t \text{ of packet train}}\right)$$

provides a measure of the available bandwidth. As noted above, a train of packets is sent at step 312 and the central server 102 records the time it takes to receive the entire train. That time value is then sent back to the client and is used in (2) as the "$\Delta t$ of packet train". Equation (2) takes the "Packet Size" (bytes) and multiplies it by the "Packet Count" (number of packets in the train) to get the number of bytes transmitted to the server. It then divides that by the Δt to calculate the bytes per second that was achieved by the packet train. This bytes per second is an estimate of the current overall available bandwidth for the connection between the unit server 104 and the central server 102.

The equation term Original % Used $$\left(\frac{\text{Original latency}}{\left(\frac{\text{Current Latency}}{\text{Number of Packets}}\right)}\right)$$

calculates how much of the original 80% (i.e. a default permitted usage of available bandwidth) should be used to determine the transfer rate. The "Current Latency" is the overall time it took to send "Number of Packets" from the unit server 104 to the central server 102. In (2), "Current Latency" is divided by "Number of Packets" to determine what the current latency is for a single packet. We then take the "Original Latency" (set when connection was first established) and divide that by the current single packet latency (Current Latency/Number of Packets) and the result is an adjustment percentage (as "Original Latency" may be a lower value than the current single packet latency (Current Latency/Number of Packets)). The "Original % Used" (80%) is multiplied by the adjustment percentage to give the new percent of the available bandwidth to use. The graph shown in FIG. 4 demonstrates how the percentage of available bandwidth is adjusted in response to changes in latency. The original latency in the graph is 10 milliseconds and each data point represents an increase in latency of 5 ms.

As noted above, a default percentage of 80% is permitted to be used. However, other percentages may be permitted in other implementations. The default percentage may provide a buffer for throttled communications to ensure that network performance is not degraded due to the time it takes for the methods described herein to adapt to current network conditions.

Figure 4:
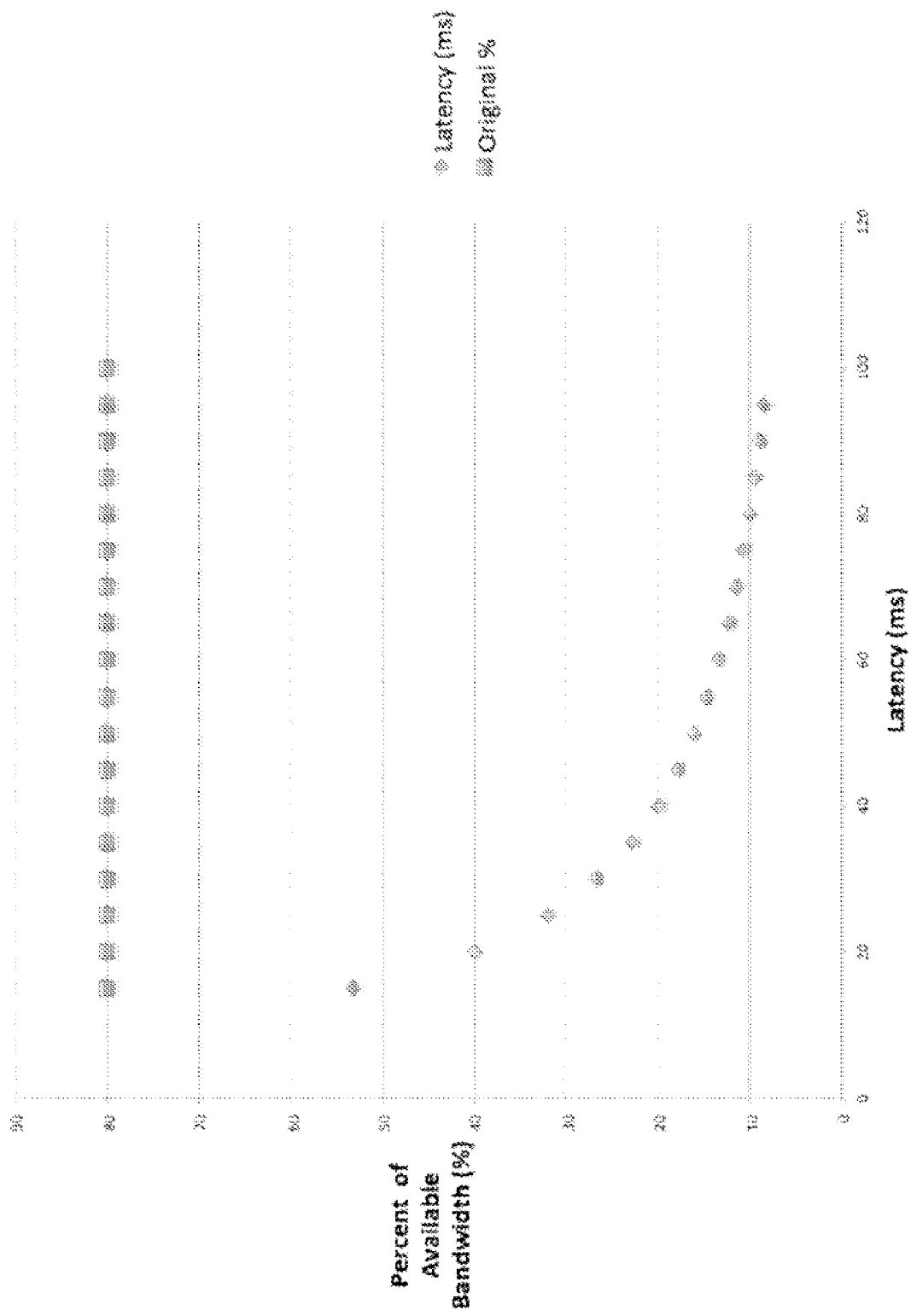
FIG. 4 is a graph illustrating a change in a percent of used bandwidth with change in latency in accordance with an embodiment of the present invention.

As is apparent in FIG. 4, the available bandwidth follows an inverse exponential curve that ensures that, as the latency on the connection increases, bandwidth utilization will quickly diminish in order to compensate.

Once we have the current available bandwidth and the new percentage of that bandwidth to utilize is determined, they are multiplied in (2) to calculate a new transfer rate (bytes per second). This transfer rate is then divide by the packet size ("Packet Size" in (2), i.e. a bytes per packet, to convert the value to packets per second. The below graph shows the transfer rate (bytes per second) changing with the change in latency (from the graph above), which follows an inverted exponential curve in response to increasing latency in the same manner as shown in FIG. 4.

The packet per second value may then be inverted to provide a measure of the amount of time (i.e. a "cycling time"), in seconds, between packets. The new cycling time may be provided to the usleep( ) subroutine in the program to indicate how long to wait between transmission of each packet. In some embodiments, the cycling time may first be converted to ms (i.e. multiplied by 1e6) before inputting it to the usleep( ) subroutine. In some embodiments, the cycling time calculated as described above may be increased by a fixed amount or a percentage in order to provide additional buffer time and reduce the risk of degraded network performance.

The dynamic throttle control implemented as described herein may use TCP (transmission control protocol) socket connections instead of UDP (user datagram protocol). However, as a result, all of the controls systems that are imposed by TCP may still be in place. In particular, the window feature of TCP may automatically adjust according to the amount of data that is being sent or received. Because of this, the packet train that is sent at step 312 to measure the current available bandwidth and latency must be large enough to "force" TCP to open the window up to allow more data to pass through (increasing the bandwidth utilized). Because of this, not all of the packets are sent at optimal speed. This causes the available bandwidth calculated to not be as precise as it would with a UDP socket (there is a ramp up time for TCP to gain optimal transfer speed). However, on larger files, available bandwidth tests will step up each time and will eventually gain that optimal transfer speed.

In using a UDP socket, a smaller packet train can be sent since there are no windows in place to govern the amount of data being passed to the destination. However, the UDP socket does not come with error handling, congestion control, or guaranteed delivery. Those components would have to be manually built for a UDP socket based system implementing the dynamic throttle control as described herein.

Referring again to FIG. 3, after a new current rate is calculated at step 316, packets may be sent at the new current rate 318 until one of the file transfer is found 320 to be complete and the send file function ends 322 or N packets are sent and steps 312-320 are executed one or more times until the end of the file is reached.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

A system for throttling network communications at a network client comprises a packet module, a calculation module, a timer module and a throttle module. The packet module is operable to generate and send sets of measurement packets for transmission from a client to a server over a connection between the client and the server. The calculation module is operable to calculate an available bandwidth and a new latency ratio from transmission times for the sets of measurement packets provided to the client by the server, and a hold time from the available bandwidth and the new latency ratio. The timer module is operable to implement a cycling timer set to the hold time. The throttle module is operable to prevent transmission of packets from the client to the server until the expiration of a cycle of the cycling timer for each packet transmitted.

The packet module is further operable to repeatedly generate and send sets of measurement packets. The calculation module is further operable to repeatedly calculate the available bandwidth, the new latency ratio, and the hold time to dynamically update the cycling timer and operation of the throttle module to changing connection conditions.

The calculation module is further operable to calculate the hold time as being inversely proportional to a product of the available bandwidth and the new latency ratio.

The product of the available bandwidth and the new latency ratio is further multiplied by a fraction of available usage to provide a buffer for throttled communications.

The packet module is further operable to repeatedly send from the client to the server, communicatively coupled with the client by a connection-based protocol, a throughput-measurement set of measurement packets. The calculation module is further operable to repeatedly receive a throughput time measured by the server of time elapsed during transmission to the server of the throughput-measurement set of measurement packets; and to repeatedly calculate the available bandwidth for the connection equal to a number of measurement packets in the throughput-measurement set of measurement packets multiplied by a packet size with a resultant product divided by the throughput time.

The throughput-measurement set of measurement packets is large enough to force Transmission Control Protocol (TCP) facilitating the connection to open a window up to allow more data to pass through, increasing the bandwidth utilized.

The packet module is further operable to repeatedly send from the client to the server, the server being communicatively coupled with the client by a connection-based protocol, a latency-measurement set of measurement packets. The calculation module is further operable to repeatedly receive a latency time measured by the server of time elapsed during transmission to the server of the latency-measurement set of measurement packets; and to repeatedly calculate the new latency ratio for the connection equal to a prior latency divided by a result generated from the latency time divided by a number of measurement packets in the latency-measurement set of measurement packets.

The system further comprises a switch module. The switch module is operable to maintain a static value for the hold time for transfers of files below a threshold size and, for file sizes that are at and above the threshold size, activate the packet module and the calculation module to actively update the hold time during transmission of a file with a size that is one of at and above the threshold size.

A method comprises calculating a throughput for a connection between a client and a server with a measurement of a time elapsed to send a set of packets to the server, calculating a ratio of a prior latency to a new latency for the connection, and throttling transmission from the client to the server by limiting transmission to one packet per cycling time period derived from the throughput and the ratio.

The method further comprises repeatedly recalculating at least one of the throughput and the ratio.

The method further comprises including an additional buffer time in the cycling time period.

The method further comprises employing a static value to control throttling of packets until an amount of data to be transferred reaches a threshold size.

The method, wherein calculating a ratio of prior latency to a new latency for the connection further comprises receiving an additional measurement sent from the server to the client of an additional time elapsed to send an additional set of packets from the client to the server.

The method further comprises deriving the time derived from the throughput and the ratio such that transmissions from the client to the server follow a reverse exponential as latency increases linearly.

A system for dynamically controlling a throttle applied to network communications comprises a throttle module, a test module and a calculation module. The throttle module is operable to space permissible windows for packet transmission, to a server from the client, with a cycling timer set to a sleep time. The test module is operable to repeatedly send test packets from the client to the server. The calculation module is operable to repeatedly update the sleep time as determined by calculations based on measurements of transmission times of the test packets provided to the client by the server.

The test module is further operable to repeatedly send a throughput set of test packets form the client to the server. The calculation module is further operable to repeatedly calculate a throughput equal to a result divided by a throughput transmission time, the result equal to a summation of sizes for test packets in the throughput set of test packets, the throughput transmission time being measured by the server and sent to the client.

The test module is further operable to repeatedly send a latency set of test packets from the client to the server after an instance of the throughput set of test packets. The calculation module is further operable to repeatedly calculate a new relative latency equal to a previous latency per packet divided by a current latency time, the current latency time equal to a latency transmission time divided by a number of packets in the latency set of test packets, the latency transmission time being measured by the server as a time elapsed in transmission of the latency set of test packets, the latency transmission time being sent from the server to the client.

The calculation module is further operable to repeatedly update the sleep time as a result determined by calculating a packet size divided by a product, the product equal to the throughput multiplied by the new relative latency.

The prior latency equals a first current latency time calculated by the calculation module upon set up of a connection between the client and the server.

The throttle module is further operable to space permissible windows for packet transmission to multiple servers connected to the client by a common network with multiple cycling timers set to multiple sleep times. The test module is further operable to repeatedly send test packets from the client to multiple servers. The calculation module is further operable to repeatedly update the multiple sleep times as determined by calculations based on measurements of transmission times of the test packets corresponding to individual servers as provided to the client by the multiple servers.

What is claimed is:

1. A system for throttling network communications at a network client, comprising:
at least one processor communicatively coupled to a memory device;
a packet module, implemented on the at least one processor, operable to generate and send sets of measurement packets for transmission from a client to a server over a network connection between the client and the server;
a calculation module, implemented on the at least one processor, operable to calculate:
a current latency time based on transmission times for the sets of measurement packets received at the client from the server;
a new latency ratio equal to a previous latency time divided by the current latency time, the new latency ratio is an adjustment percentage based on current single packet latency time and original latency time when a network connection is first established;
an available bandwidth based on the transmission times for the sets of measurement packets received at the client from the server; and
a hold time based on the available bandwidth and the new latency ratio;

a timer module, implemented on the at least one processor, operable to implement a cycling timer set to the hold time; and
a throttle module, implemented on the at least one processor, operable to prevent transmission of packets from the client to the server until the expiration of a cycle of the cycling timer for each packet transmitted, wherein bandwidth utilization is automatically adjusted dynamically according to percentage of available bandwidth in response to changes in latency.

2. The system of claim 1, wherein:
the packet module is further operable to repeatedly generate and send the sets of measurement packets; and
the calculation module is further operable to repeatedly calculate the available bandwidth, the new latency ratio, and the hold time to dynamically update the cycling timer and operation of the throttle module to changing connection conditions.

3. The system of claim 1, wherein the calculation module is further operable to calculate the hold time as being inversely proportional to a product of the available bandwidth and the new latency ratio.

4. The system of claim 3, wherein the product of the available bandwidth and the new latency ratio is further multiplied by a fraction of available usage to provide a buffer for throttled communications.

5. The system of claim 1, wherein:
the packet module is further operable to repeatedly send from the client to the server, communicatively coupled with the client by a connection-based protocol, a throughput-measurement set of measurement packets; and
the calculation module is further operable to repeatedly:
receive a throughput time measured by the server of time elapsed during transmission to the server of the throughput-measurement set of measurement packets; and
calculate the available bandwidth for the connection equal to a number of measurement packets in the throughput-measurement set of measurement packets multiplied by a packet size with a resultant product divided by the throughput time.

6. The system of claim 5, wherein the throughput-measurement set of measurement packets is large enough to force Transmission Control Protocol (TCP) facilitating the connection to open a window up to allow more data to pass through, increasing bandwidth utilized.

7. The system of claim 1, wherein:
the packet module is further operable to repeatedly send from the client to the server, the server being communicatively coupled with the client by a connection-based protocol, a latency-measurement set of measurement packets;
the calculation module is further operable to repeatedly:
receive a current latency time measured by the server of time elapsed during transmission to the server of the latency-measurement set of measurement packets; and
calculate the new latency ratio for the connection equal to a prior latency time per packet divided by a result generated from the current latency time divided by a number of measurement packets in the latency-measurement set of packets.

8. The system of claim 1, further comprising:
a switch module, the switch module operable to maintain a static value for the hold time for transfers of files below a threshold size and, for files sizes that are at and above the threshold size, activate the packet module and calculation module to actively update the hold time during transmission of a file with a size that is one of at or above the threshold size.

9. A method for dynamically throttling network communications at a network client, the method comprising:
sending, by a packet module, sets of measurement packets for transmission from a client to a server over a network connection between the client and the server;
calculating, by a calculation component associated with a client, a throughput for a network connection between the client and a server with a measurement of time elapsed to send the set of packets from the client to the server, the measurement of the time elapsed is received at the client from the server via a network device;
calculating, by the calculation component, a ratio of a prior latency to a new latency based on the measurement of the time elapsed to send the set of packets to the server for the connection, the ratio is an adjustment percentage based on current latency time and an original latency time;
calculating a hold time based on the available bandwidth and the new latency ratio;
setting, by a timer module, a cycling timer to the calculated hold time; and
throttling transmission from the client to the server by limiting transmission to one packet per cycling time period derived from the throughput and the ratio.

10. The method of claim 9, further comprising:
repeatedly recalculating at least one of the throughput and the ratio.

11. The method of claim 9, further comprising:
including an additional buffer time in the cycling time period.

12. The method of claim 9, further comprising:
employing a static value to control throttling of packets until an amount of data to be transferred reaches a threshold size.

13. The method of claim 9, wherein calculating the ratio of the prior latency to the new latency for the connection further comprises:
receiving an additional measurement sent from the server to the client of an additional time elapsed to send an additional set of packets from the client to the server.

14. The method of claim 9, further comprising:
deriving the time derived from the throughput and the ratio such that transmissions from the client to the server follow a reverse exponential as latency increases linearly.

15. A system for dynamically controlling a throttle applied to network communications, comprising:
at least one processor communicatively coupled to a memory device;
a throttle module, implemented on the at least one processor, operable to space permissible windows for packet transmission, to a server from a client, with a cycling timer set to a sleep time;
a test module, implemented on the at least one processor, operable to repeatedly send test packets from the client to the server; and
a calculation module, implemented on the at least one processor, operable to:
repeatedly calculate a new relative latency equal to a previous latency time per packet divided by a current latency time per packet, the current latency time per packet equal to a latency transmission time divided by a number of packets in the test packets, the latency transmission time being measured by the server as a time elapsed in transmission of the test packets, the latency transmission time including transmission times for the test packets received at the client from the server, wherein the previous latency time per packet equals a first current latency time per packet calculated by the calculation module upon set up of a connection between the client and the server;
divide the previous latency time by current latency time per packet to obtain an adjustment percentage;
calculate a percentage available bandwidth based on the adjustment percentage and
repeatedly update the sleep time as determined by calculations based on measurements of transmission times of the test packets provided to the client by the server.

16. The system of claim 15, wherein:
the test module is further operable to repeatedly send a throughput set of test packets form the client to the server; and
the calculation module is further operable to repeatedly calculate a throughput equal to a result divided by a throughput transmission time, the result equal to a summation of sizes for test packets in the throughput set of test packets, the throughput transmission time being measured by the server and sent to the client.

17. The system of claim 16, wherein:
the test module is further operable to repeatedly send a latency set of test packets from the client to the server after an instance of the throughput set of test packets.

18. The system of claim 15, wherein the calculation module is further operable to repeatedly update the sleep time as a result determined by calculating a packet size divided by a product, the product equal to the throughput multiplied by the new relative latency.

19. The system of claim 15, wherein bandwidth utilization is automatically adjusted dynamically according to percentage of available bandwidth in response to changes in latency.

20. The system of claim 15, wherein:
the throttle module is further operable to space permissible windows for packet transmission to multiple servers connected to the client by a common network with multiple cycling timers set to multiple sleep times;
the test module is further operable to repeatedly send test packets from the client to multiple servers; and
the calculation module is further operable to repeatedly update the multiple sleep times as determined by calculations based on measurements of transmission times of the test packets corresponding to individual servers as provided to the client by the multiple servers.

* * * * *